(12) United States Patent
Washio et al.

(10) Patent No.: US 12,210,210 B2
(45) Date of Patent: Jan. 28, 2025

(54) LENS DRIVING DEVICE, CAMERA DEVICE AND ELECTRONIC APPARATUS

(71) Applicant: New Shicoh Motor Co., LTD, Zhejiang (CN)

(72) Inventors: Noriyuki Washio, Yamato (JP); Tomoyoshi Yano, Yamato (JP)

(73) Assignee: New Shicoh Motor Co., LTD, Zhejiang (CN)

( * ) Notice: Subject to any disclaimer, the term of this patent is extended or adjusted under 35 U.S.C. 154(b) by 533 days.

(21) Appl. No.: 17/564,865

(22) Filed: Dec. 29, 2021

(65) Prior Publication Data

US 2022/0206248 A1 Jun. 30, 2022

(30) Foreign Application Priority Data

Dec. 29, 2020 (CN) .......................... 202011605738.2

(51) Int. Cl.
*G02B 7/09* (2021.01)
*G02B 27/64* (2006.01)
*G03B 5/00* (2021.01)
*G03B 13/36* (2021.01)

(52) U.S. Cl.
CPC ............. *G02B 7/09* (2013.01); *G02B 27/646* (2013.01); *G03B 5/00* (2013.01); *G03B 13/36* (2013.01); *G03B 2205/0007* (2013.01)

(58) Field of Classification Search
CPC .......... G02B 7/09; G02B 27/646; G03B 5/00; G03B 13/36; G03B 2205/0007; G03B 2205/0053; G03B 3/10; G03B 30/00
See application file for complete search history.

(56) References Cited

U.S. PATENT DOCUMENTS

| 2018/0120674 A1 | 5/2018 | Avivi et al. | |
| 2021/0088877 A1* | 3/2021 | Mireault | G03B 17/17 |
| 2022/0019127 A1* | 1/2022 | Saito | G03B 5/00 |

* cited by examiner

*Primary Examiner* — Collin X Beatty
(74) *Attorney, Agent, or Firm* — Hayes Soloway PC

(57) ABSTRACT

A lens driving device is described that includes, in an XYZ orthogonal coordinate system, a base, an intermediate member, a movable portion with an attachment portion for attaching a lens body, suspension wires arranged between the base and the intermediate member, and wire-shaped leaf springs arranged between the intermediate member and the movable portion. The suspension wires extend in a Y direction and movably support the intermediate member in an X direction and a Z direction. The wire-shaped leaf springs extend in an X direction and a Z direction and movably support the movable portion in the Y direction. A damper gel is arranged between the leaf spring and the movable portion and the intermediate member, and a damper gel is arranged between the suspension wire and the intermediate member and the base.

10 Claims, 6 Drawing Sheets

LENS DRIVING DEVICE, CAMERA DEVICE AND ELECTRONIC APPARATUS

CROSS-REFERENCE TO RELATED APPLICATIONS

This application claims the benefit of Chinese Patent Application No. 202011605738.2 filed Dec. 29, 2020, which is hereby incorporated by reference herein in its entirety.

TECHNICAL FIELD

The present disclosure relates to a lens driving device used in an electronic apparatus such as a smartphone, a camera device and other types of electronic apparatuses.

BACKGROUND

Some lens driving devices among the lens driving device that have both OIS (Optical Image Stabilizer) function and AF (Auto Focus) function are called periscopic type. In a periscopic lens driving device, a lens body and an image sensor are arranged side by side in a direction orthogonal to the incident direction of light from a subject, and the light from the subject is reflected by a prism or a mirror, transmitted through the lens body, focused on the image sensor, and converted into an image signal by the image sensor. As a document disclosing a technique related to this type of lens driving device, U.S. Patent Application Laid-Open No. 2018/0120674A (hereinafter referred to as Patent Document 1) can be given. In the camera module described in Patent Document 1, a lens prism unit and an actuator driving the lens prism unit are contained in a housing that combined a base and a moving support structure. In this camera module, the lens prism unit is supported by four wires so as to be movable in two axial directions of the OIS, and is supported by a ball in the groove of the inner wall of the moving support structure so as to be movable in one axial direction of the AF.

SUMMARY

However, the technique disclosed in the Patent Document 1 had a problem that since the length of the lens body in the optical axis direction was long, and it was difficult to quickly converge the three axial movements of the lens body.

The present disclosure has been made in view of such a problem, and the present disclosure aims to provide a lens driving device capable of quickly converging the movements of the lens body in three axial directions.

In order to solve the above-described mentioned problem, in accordance with a first aspect of the present disclosure, there is provided a lens driving device includes, in an XYZ orthogonal coordinate system: a base; an intermediate member; a movable portion with an attachment portion for attaching a lens body; suspension wires arranged between the base and the intermediate member, extending in a Y direction, and movably supporting the intermediate member in an X direction and a Z direction, which are optical axis directions of the lens body; and wire-shaped leaf springs arranged between the intermediate member and the movable portion, extending in an X direction and a Z direction, and movably supporting the movable portion in the Y direction, wherein a damper gel is arranged between the leaf spring and the movable portion and the intermediate member, and a damper gel is arranged between the suspension wire and the intermediate member and the base.

In accordance with a second aspect of the present disclosure, there is provided a camera device including the lens driving device described above.

In accordance with a third aspect of the present disclosure, there is provided an electronic apparatus including the camera device described above.

Further features of the present invention will become apparent from the following description of exemplary embodiments (with reference to the attached drawings).

DETAILED DESCRIPTION

Figure 1:
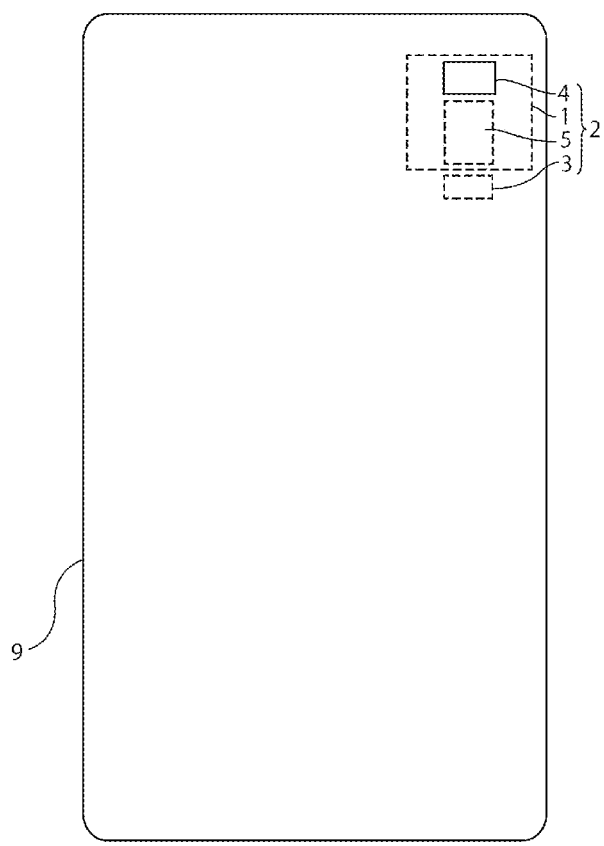
FIG. 1 is a front view of a smartphone on which a camera device including a lens driving device according to one embodiment of the present disclosure is mounted.

Hereinafter, embodiments of the present disclosure are explained with reference to drawings. As shown in FIG. 1, a camera device 2 including a lens driving device 1 according to one embodiment of the present disclosure is accommodated in a smartphone 9.

The camera device 2 has an image sensor 3, a mirror 4 that reflects light from a subject, a lens body 5 that guides the light reflected by the mirror 4 to the image sensor 3, and a lens driving device 1 that drives the lens body 5.

Hereinafter, as shown in FIG. 2 through FIG. 6B, a direction in which the light from the subject is incident is appropriately referred to as a Y direction. Further, one direction in which the light reflected by the mirror 4 is directed toward the lens body 5 is referred to as an X direction, and a direction orthogonal to the Y direction and the X direction is referred to as a Z direction. Further, the +Y side may be referred to as an upper side, the −Y side may be referred to as a lower side, the +X side may be referred to as a rear side, the −X side may be referred to as a front side, the +Z side may be referred to as a left side, and the −Z side may be referred to as a right side.

Figure 3:
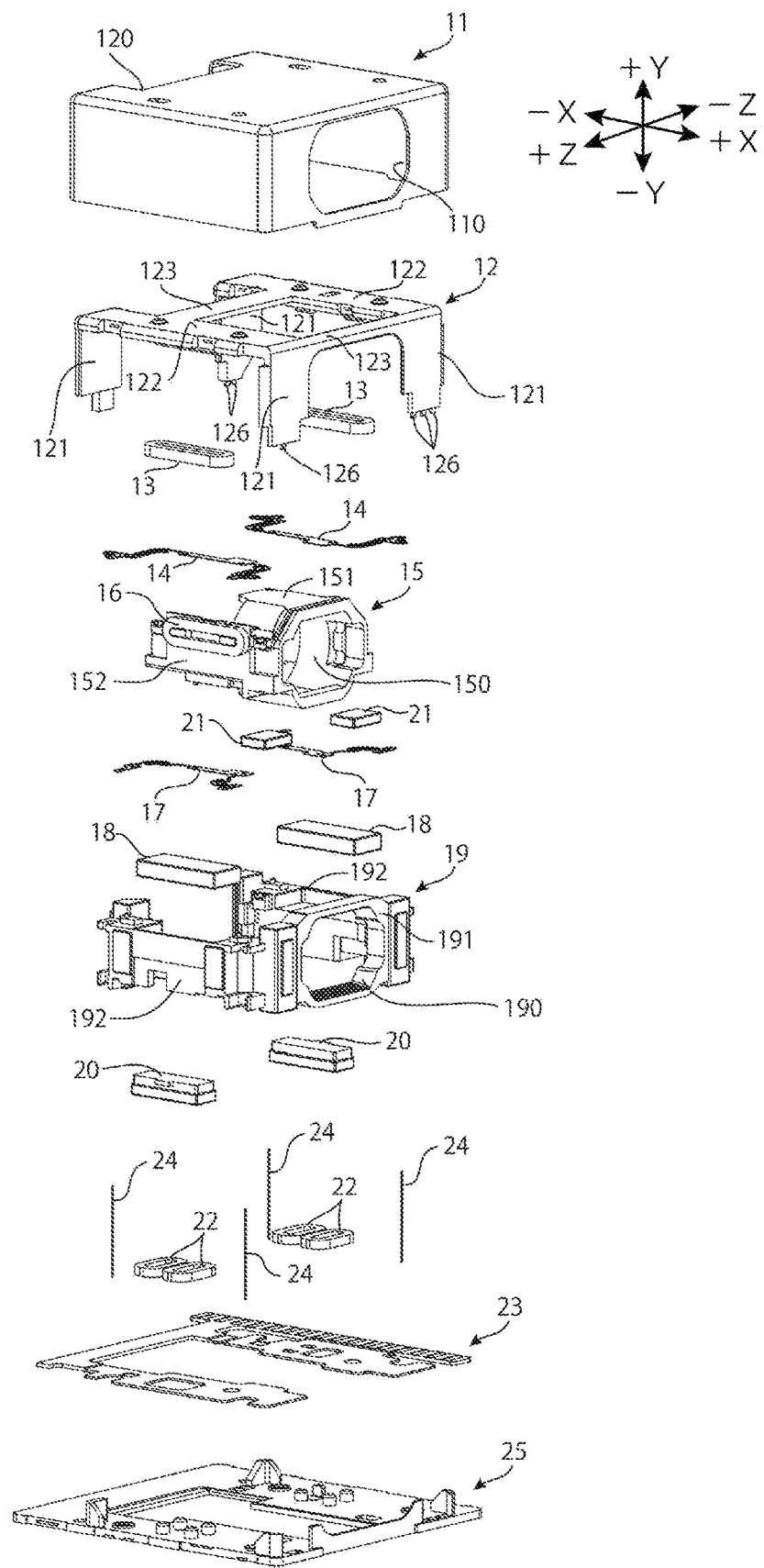
FIG. 3 is an exploded perspective view of the lens driving device shown in FIG. 2.
Figure 4:
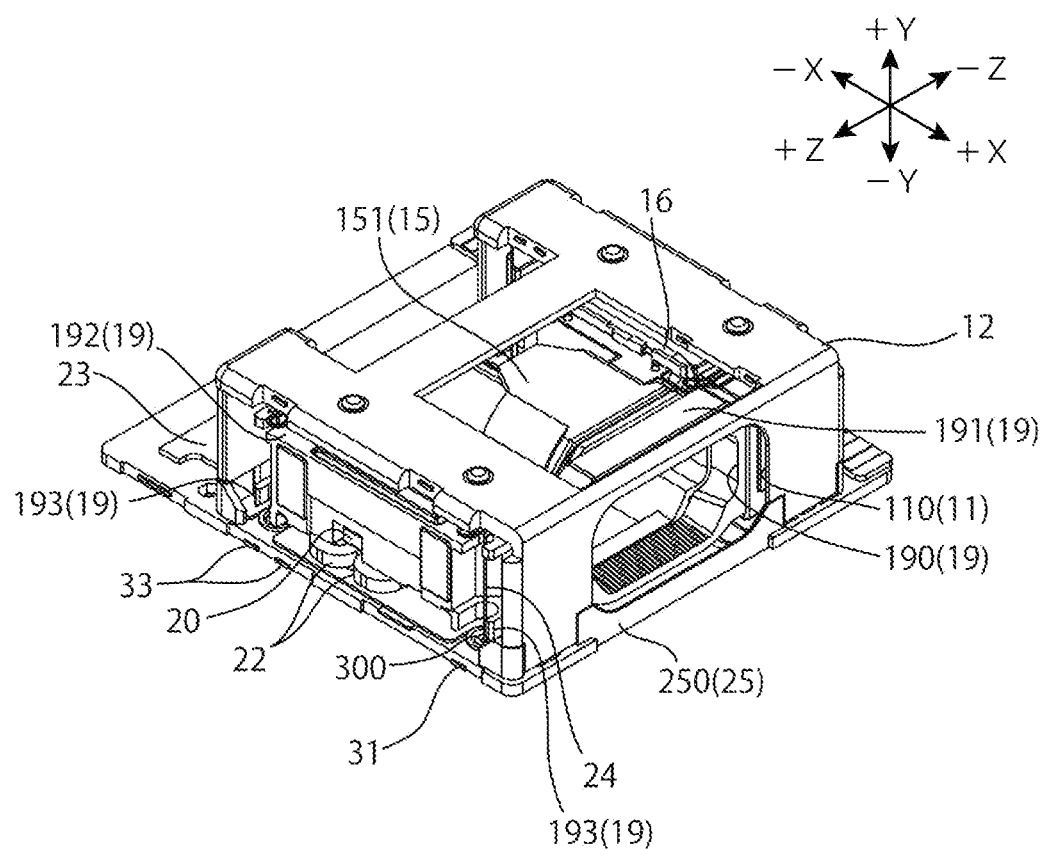
FIG. 4 is a perspective view in which the case is removed from the lens driving device shown in FIG. 2.

As shown in FIG. 3, the lens driving device 1 has a case 11, a frame 12, first coils for OIS (Optical Image Stabilizer) 13, upper side leaf springs 14, a carrier 15, second coils for OIS 16, lower side leaf springs 17, magnets for OIS (Optical Image Stabilizer) 18, a holder 19, magnets for AF (Auto Focus) 20, magnets for detection 21, coils for AF (Auto Focus)22, an FPC (flexible printed circuit board) 23, suspension wires 24, and a base 25. Among these, the carrier 15, the second coils for OIS 16, and the magnets for detection 21 constitute a movable portion 10. In addition, the magnets for OIS 18, the holder 19, and the magnets for AF 20 constitute an intermediate member 29. In addition, the case 11, the frame 12, the first coils for OIS 13, the coils for AF 22, the FPC 23, and the base 25 constitute a fixed portion 27.

Figure 5A:
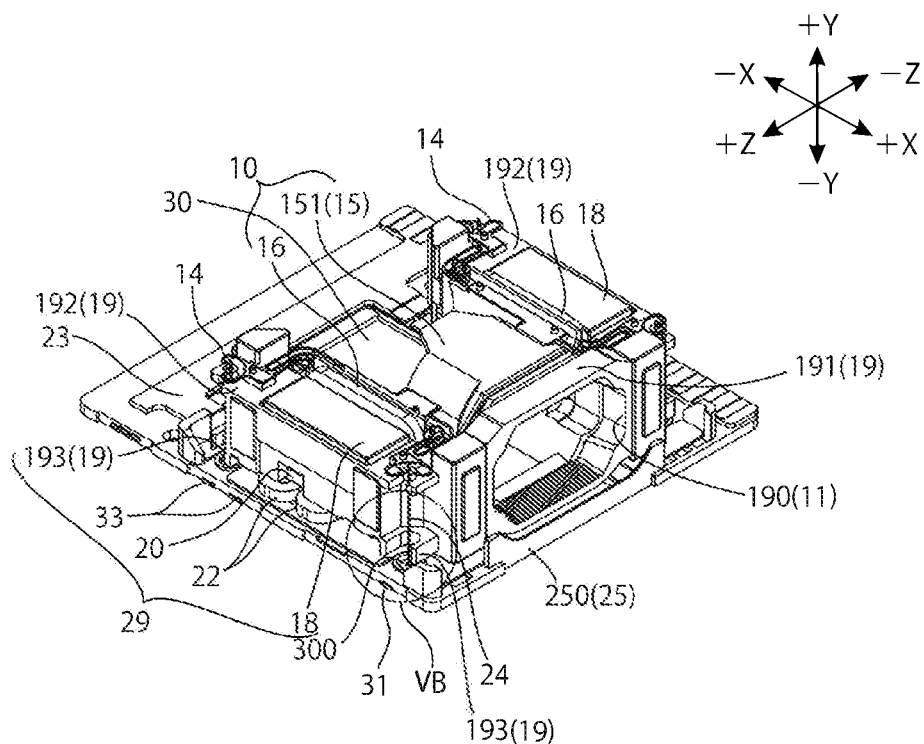
FIG. 5A is a perspective view in which the frame is removed from the lens driving device shown in FIG. 4.

As shown in FIG. 5A, the movable portion 10 is supported by the holder 19 of the intermediate member 29 via the upper side leaf springs 14 and the lower side leaf springs 17. The movable portion 10 is movable in the Y direction with respect to the intermediate member 29. The intermediate member 29 is supported by the base 25 of the fixed portion 27 via the suspension wires 24. The intermediate member 29 together with the movable portion 10 supported by the intermediate member 29 can move in the X direction and the Z direction with respect to the fixed portion 27. Thus, the movable portion 10 is movable in the X direction, the Y direction and the Z direction with respect to the fixed portion 27. In addition, the first coils for OIS 13, the second coils for OIS 16, the magnets for OIS 18, the magnets for AF 20, and the coils for AF 22 are driving sources for moving the lens body 5 with respect to the base 25.

Figure 2:
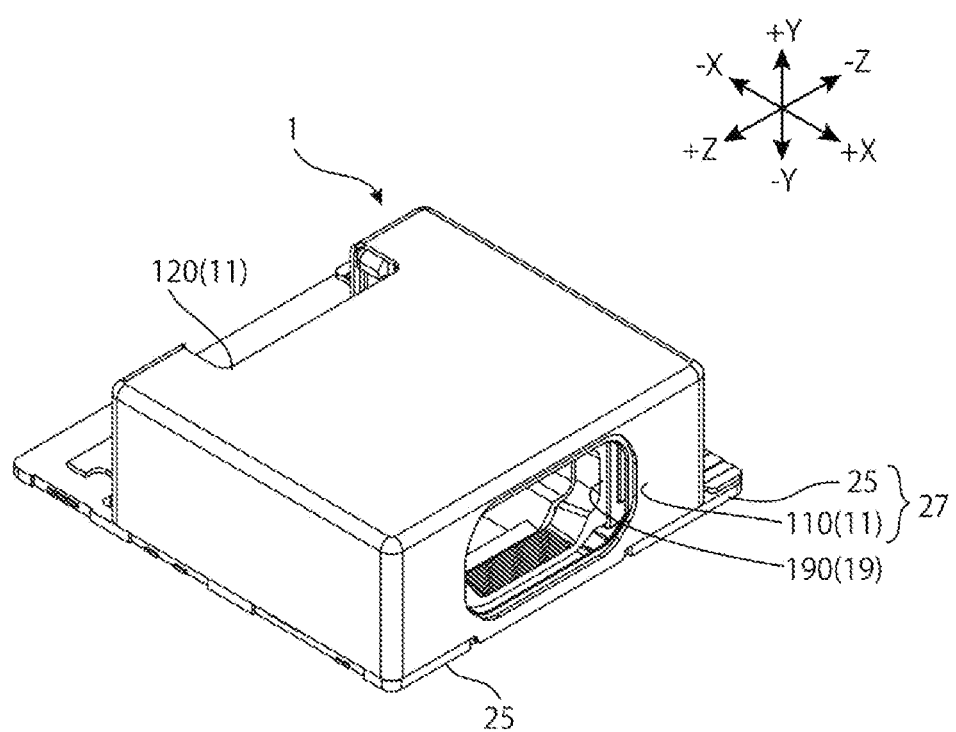
FIG. 2 is a perspective view of the lens driving device shown in FIG. 1.

As shown in FIG. 2, the case 11 and the base 25 are combined as a housing. A first opening 110 is provided in the center of the rear side wall of the case 11. A second opening 120 is provided in a portion ranging from the center of the front side wall to the upper side wall of the case 11.

As shown in FIG. 5A, the base 25 is formed by molding the main body of the base 25 with resin in a state where the metal plate member 30, the first metal members 31, 33 are arranged in the resin. A rising portion 250 rising up to the upper side is provided at an edge on the rear side of the base 25. An FPC 23, which is a flexible printed circuit board, is arranged on the base 25.

A thickness of the metal plate member 30 embedded in the base 25 is thinner than a thickness of the base 25, and is exposed on the upper and lower sides of the base 25 at a position corresponding to the carrier 15. The end portions of the first metal members 31, 33 are exposed from the end surfaces on the left side and the right side of the base 25. The first metal members 31, 33 embedded in the base 25 have through holes 300. The portions where the through holes 300 of the first metal members 31, 33 are provided are exposed on the upper surface side and the lower surface side of the base 25.

Figure 5B:
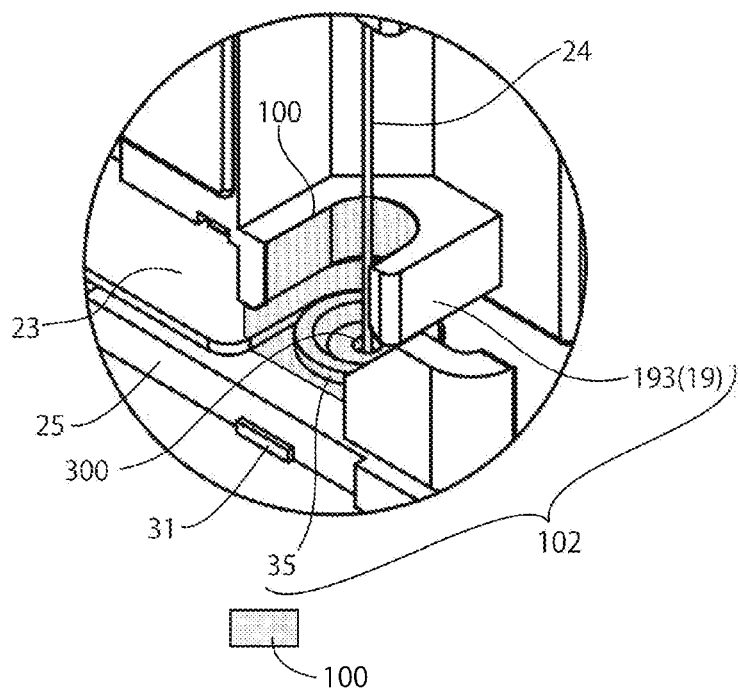
FIG. 5B is a partial enlarged view showing enlarged a portion VB shown in FIG. 5A.

As shown in partial enlarged view of FIG. 5B, receiving portions 35 for receiving a damper gel 100 are formed on the upper surface of the base 25. The receiving portions 35 are walls surrounding the through holes 300 of the first metal members 31, 33. The damper gel 100 is a resin with viscoelasticity and has the function of attenuating vibration.

As shown in FIG. 5B, the lower end of the suspension wire 24 passes through the through hole 300 of the first metal member 31. The suspension wire 24 penetrates the first metal member 31 of the base 25 and is soldered from the lower surface of the first metal member 31. Therefore, the lower end of the suspension wire 24 is fixed to the base 25, and the receiving portion 35 is formed to surround the lower end of the suspension wire 24 with a wall.

As shown in FIG. 3, a Hall element for X direction detection and a Hall element for Y direction detection as electrical components are attached to the lower surface of the FPC23. The Hall element for X direction detection and the Hall element for Y direction detection are accommodated in the accommodation cavity of the base 25. The coils for AF 22 are provided on the left side and the right side of the upper surface of the FPC23.

The frame 12 is formed by molding the main body of the frame 12 with resin in a state where the second metal members 126 are arranged in the resin. The end portions of the second metal members 126 protrude from the lower end portions of the frame 12. The second metal members 126 form electric wirings and serve both for reinforcing the frame 12 and for electric wiring. The lower end portions of the frame 12 are fixed to the base 25. The protruding end portions of the second metal members 126 are electrically connected to the FPC23.

The frame 12 has two rising portions 121 rising up from the left side of the base 25, two rising portions 121 rising up from the right side of the base 25, left and right horizontal portions 122 connecting the two rising portions 121 on the left and right respectively, and connection portions 123 connecting the left and right horizontal portions 122. The two rising portions 121 oppose to each other in the optical axis direction. A first coil for OIS 13 and a Hall element for Z direction detection as electrical components are provided on the lower surface of the horizontal portion 122 on the right side of the frame 12, and are electrically connected to the second metal member 126, respectively. A first coil for OIS 13 as an electrical component is provided on the lower surface of the horizontal portion 122 on the left side of the frame 12, and is electrically connected to the second metal member 126.

Figure 6A:
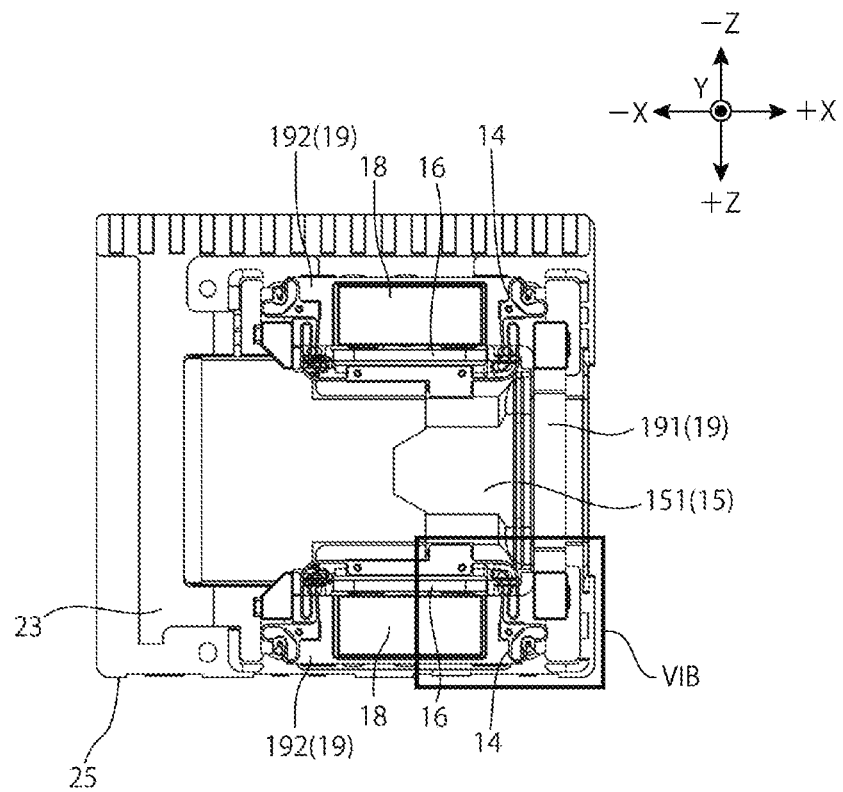
FIG. 6A is a view showing the lens driving device shown in FIG. 5A as viewed from the +Y side.
Figure 6B:
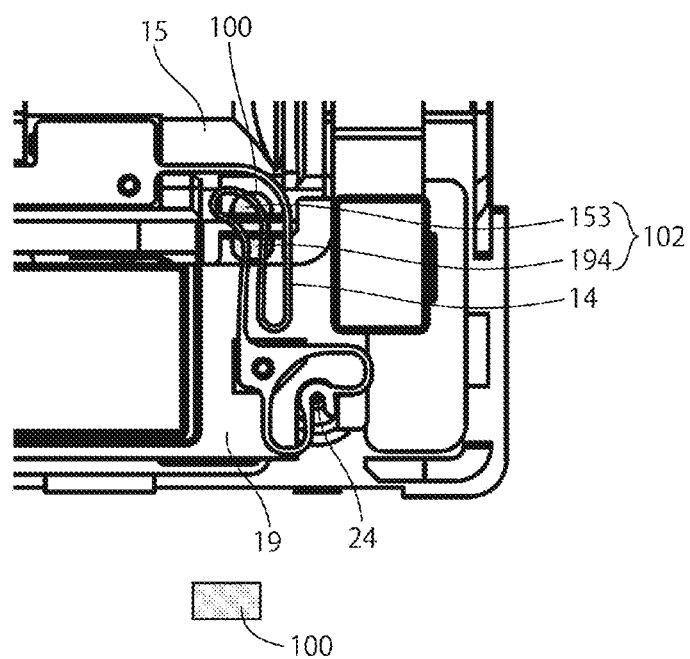
FIG. 6B is a partial enlarged view showing enlarged a portion VIB shown in FIG. 6A.

The holder 19 has a frame portion 191 surrounding the holder opening 190, and first wall portions 192 extending forward from the left and right peripheral portions of the frame portion 191. As shown in FIGS. 5A and 5B, U-shaped recess portions 193 opened in the Z direction are provided at lower ends of the front, rear, left and right corner portions of the first wall portions 192. A magnet for OIS 18 is provided on the upper surface of the first wall portion 192. A magnet for AF 20 is provided on the lower surface of the first wall portion 192. The upper side leaf springs 14 are fixed to the upper surface of the holder 19, and the lower side leaf springs 17 are fixed to the lower surface of the holder 19. As shown in FIGS. 6A and 6B, the upper side leaf springs 14 are formed in a wire shape (a linear shape) extending while meandering inward from the front, rear, left and right on the upper side of the holder 19. The lower side leaf springs 17 are formed in a wire shape (a linear shape) extending while meandering inward from the front, rear, left and right on the lower side of the holder 19.

As shown in FIG. 3, the carrier 15 is a lens supporting body that supports the lens body 5. The carrier 15 has a cylindrical body 151 and second wall portions 152 extending forward from the peripheral edge portions on the left side and the right side of the cylindrical body 151. The second wall portions 152 are formed by cutting off the upper side portion and the lower side portion at the front portion of the cylindrical body 151. A through hole 150 is provided in the cylindrical body 151. The through hole 150 and an inner edge portion forming the through hole 150 are an attachment portion of the lens body 5. After the lens driving device 1 is completed, the lens body 5 is fitted into the through hole 150 from between the left and the right second wall portions 152 of the carrier 15 and attached to the carrier 15. The front, rear, left and right of the upper side of the carrier 15 are supported by the upper side leaf springs 14, and the front, rear, left and right of the lower side of the carrier 15 are supported by the lower side leaf springs 17. The center of gravity of the movable portion 10 including the lens body 5 and the carrier 15 that supports the lens body 5 is located approximately at the center of the front, rear, left and right upper side leaf springs14 and the lower side leaf springs 17.

Specifically, as shown in FIG. 6A, four upper side leaf springs 14 are provided and four paths of the upper side leaf springs 14 from the holder 19 to the carrier 15 have a shape that forms line symmetry with the X direction and the Z direction as axes. When the lens body 5 is attached, a gravity center position of the entire movable portion 10 including the lens body 5 coincides with the crossing point of the symmetric axis in the X direction and the symmetric axis in the Z direction when viewed from the Y direction. The shape of the entire movable portion 10 including the lens body 5 is asymmetric with respect to the symmetric axis in the Z direction described above, but thereby, when the movable portion 10 including the lens body 5 moves in the Y direction, the movable portion 10 is unlikely to tilt. The lower side leaf springs 17 have the same structure as that of the upper side leaf springs 14. In addition, the gravity center position is desirably an intermediate position between the upper side leaf spring 14 and the lower side leaf spring 17.

As shown in Fig. 3, the second coils for OIS 16 are provided on the outer surfaces of the left and right second wall portions 152 of the carrier 15. The magnets for detection 21 are provided on the lower surface of the rear portion of the second wall portion 152. In addition, the connection portions 123 of the frame 12 are provided at portions where the upper portion of the cylindrical body 151 is cut off, and the cylindrical body 151 and the connection portions 123 overlap when viewed from the X direction.

The suspension wire 24 passes through the U-shaped recess portion 193 of the holder 19, and is bridged between the through hole 300 of the base 25 and the upper side leaf spring 14. The lower end of the suspension wire 24 is inserted and soldered to the through hole 300 of the base 25. As shown in FIG. 6B, the upper end of the suspension wire 24 is inserted and soldered to the tip end portion of the upper side leaf spring 14 which is formed in a ring shape on the outer side of the holder 19.

As shown in FIG. 5B, a damper gel 100 is arranged between the lower end portion of the suspension wire 24 and the U-shaped recess portion 193 of the holder 19 and the receiving portion 35 of the base 25. The U-shaped recess portion 193 is provided at an interval directly above the receiving portion 35 and forms a damper gel reservoir 102 together with the receiving portion 35.

As shown in FIG. 6B, a carrier receiving portion 153 is formed on the upper surface of the carrier 15 so as to be recessed downward. In addition, a holder receiving portion 194 is formed on the upper surface of the holder 9 so as to be recessed downward. The carrier receiving portion 153 and the holder receiving portion 194 are provided to oppose to each other with a gap sandwiched therebetween, and the lower surface of the meandering portion of the upper side leaf spring 14 is provided above the two so as to oppose to each other with the gap sandwiched therebetween. A damper gel 100 is provided between the meandering portion of the upper side leaf spring 14 and the carrier receiving portion 153 and the holder receiving portion 194. The carrier receiving portion 153 and the holder receiving portion 194 form a damper gel reservoir 102. The meandering portion may be located multiple times above the same damper gel reservoir 102.

The second coil for OIS 16 that constitutes the movable portion 10 and the magnet for OIS 18 that constitutes the intermediate member 29 oppose to each other. When an electric current flows in the second coil for OIS 16, an electromagnetic force in the Y direction is generated in the second coil for OIS 16, and the movable portion 10 moves in the Y direction with respect to the intermediate member 29. The Hall element for Y direction detection detects the magnetic field of the opposing magnet for detection 21 and outputs a signal indicating the detection result. This signal corresponds to the position of the magnet for detection 21 in the Y direction with respect to the Hall element for Y direction detection.

The magnet for OIS 18 that constitutes the intermediate member 29 and the first coil for OIS 13 that constitutes the fixed portion 27 oppose to each other. When an electric current flows in the first coil for OIS 13, an electromagnetic force in the Z direction is generated in the first coil for OIS 13 and a reaction force is generated in the magnet for OIS 18. The intermediate member 29 moves in the Z direction with respect to the fixed portion 27. The Hall element for Z direction detection detects the magnetic field of the opposing magnet for OIS 18 and outputs a signal indicating the detection result. This signal corresponds to the position of the magnet for OIS 18 in the Z direction with respect to the Hall element for Z direction detection.

As shown in FIG. 5A, the magnet for AF 20 that constitutes the intermediate member 29 and the coil for AF 22 that constitutes the fixed portion 27 oppose to each other. When an electric current flows in the coil for AF 22, an electromagnetic force in the X direction is generated in the coil for AF 22, and a reaction force is generated in the magnet for AF 20. The intermediate member 29 moves in the X direction with respect to the fixed portion 27. The Hall element for X direction detection detects the magnetic field of the opposing magnet for AF 20 and outputs a signal indicating the detection result. This signal corresponds to the position of the magnet for AF 20 in the X direction with respect to the Hall element for X direction detection.

The lens driving device 1 in the present embodiment includes, in the XYZ orthogonal coordinate system: a base 25; a holder 19 as an intermediate member 29; a carrier 15 as a movable portion 10 with an attachment portion from attaching a lens body 5; suspension wires 24 provided between the base 25 and the holder 19, extending in the Y direction, and movably supporting the holder 19 in the X direction and the Z direction, which are the optical axis directions of the lens body 5; and wire-shaped upper side leaf springs 14 arranged between the holder 19 and the carrier 15, extending in the X direction and the Z direction, and movably supporting the movable portion 10 in the Y direction. A damper gel 100 is arranged between the upper side leaf spring 14 and the carrier 15 and the holder 19, and a damper gel 100 is arranged between the suspension wire 24 and the holder 19 and the base 25. Thus, it is possible to provide a lens driving device 1 capable of quickly converging the movements of the lens body 5 in three axial directions.

It is to be noted that in the above embodiment, the receiving portion 35 may not be provided on the base 25, and a damper gel 100 may be arranged between the U-shaped recess portion 193 of the holder 19 and the upper surface of the base 25.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A lens driving device, comprising:
in an XYZ rectangular coordinate system,
a base;
an intermediate member;
a movable portion having a cylindrical body of a carrier for supporting a lens body;
suspension wires arranged between the base and the intermediate member, extending in a Y direction, and movably supporting the intermediate member in a Z direction and in an X direction, wherein the X direction is an optical axis direction of the lens body; and wire-shaped leaf springs arranged between the intermediate member and the movable portion, extending in the X and the Z direction, and movably supporting the movable portion in the Y direction, wherein one first damper gel is arranged between the meandering portions of the leaf spring and a carrier receiving portion of the carrier of movable portion and a holder receiving portion of the intermediate member, and one second damper gel is arranged between a lower end of the suspension wire and a U-shaped recess portion of the intermediate member and a receiving portion of the base.

2. The lens driving device according to claim 1, wherein a first damper gel reservoir comprises the carrier receiving portion and the holder receiving portion and a second damper gel reservoir comprises the U-shaped recess portion and the receiving portion.

3. The lens driving device according to claim 2, wherein the meandering portions of the wire-shaped leaf spring is located above the carrier receiving portion and the holder receiving portion.

4. The lens driving device according to claim 1, wherein four leaf springs are provided, and four paths of the leaf springs from the intermediate member to the movable portion have a shape that forms line symmetry with the X direction and the Z direction as axes, when the lens body is attached, a gravity center position of the entire movable portion comprising the lens body coincides with a crossing point of an symmetric axis in the X direction and an symmetric axis in the Z direction when viewed from the Y direction.

5. The lens driving device according to claim 4, wherein a shape of the entire movable portion comprising the lens body is asymmetric with respect to the symmetric axis in the Z direction.

6. The lens driving device according to claim 2, wherein the one second damper gel is arranged between the second damper gel reservoir and a lower end of the suspension wire fixed to the receiving portion of the base, and the second damper gel reservoir is provided on an upper surface of the base in the Y direction and side surfaces of the intermediate member facing the X direction and the Z direction of the intermediate member.

7. The lens driving device according to claim 6, wherein the second damper gel reservoir provided on the base is formed on the upper surface of the base to surround the suspension wire with a wall.

8. The lens driving device according to claim 6, wherein the second damper gel reservoir provided in the intermediate member is formed as a U-shaped recess portion opened in the Z direction at a lower portion of the intermediate member.

9. A camera device comprising the lens driving device of claim 1.

10. An electronic apparatus comprising the camera device of claim 9.

* * * * *